United States Patent [19]
Chen

[11] Patent Number: 5,785,154
[45] Date of Patent: Jul. 28, 1998

[54] WHEEL WITH BRAKE DEVICE

[75] Inventor: Chih-Yao Chen, Hsin Chu, Taiwan

[73] Assignee: Kingstar Baby Carriages, Co., Ltd., Taiwan

[21] Appl. No.: 804,109

[22] Filed: Feb. 20, 1997

[51] Int. Cl.⁶ .................................................. B60B 33/00
[52] U.S. Cl. ........................................ 188/1.12; 16/35 R
[58] Field of Search ......................... 188/1.12; 16/35 R; 280/33.994; 301/6.1

[56] References Cited

U.S. PATENT DOCUMENTS

| | | | |
|---|---|---|---|
| 4,629,036 | 12/1986 | Choy | 188/1.12 |
| 5,607,030 | 3/1997 | Swift et al. | 188/1.12 |
| 5,617,934 | 4/1997 | Yang | 188/1.12 |

*Primary Examiner*—Chris Schwartz
*Attorney, Agent, or Firm*—Beveridge, DeGrandi, Weilacher & Young, LLP

[57] ABSTRACT

A type of wheel with a brake device is devised which consists of 2 corresponding housings. A curved trough is facilitated between the inner and outer edges of one of the 2 housings; the curve trough containing a shaft. One end of the shaft touches the inner side of the curved trough whereas the other end touches the inner side of the other housing. The two lateral sides of a secure mount fit over the two lateral sides of the wheel; a wheel axle is inserted through the mount and the housings to form the wheel. A joining device is facilitated at the outer end of the axle which functions to connect the device to other objects such as vehicles, chairs, toddler chairs, etc. A convex shape locking device that fits perfectly in the inner sides of the 2 housings is facilitated in the inner side of the mount so that when the wheel is spinning rapidly, the shaft between the 2 housings swings outward and locks onto the convex device due to centrifugal force which serves to restrict the motion of the wheel and achieves a brake function.

2 Claims, 4 Drawing Sheets

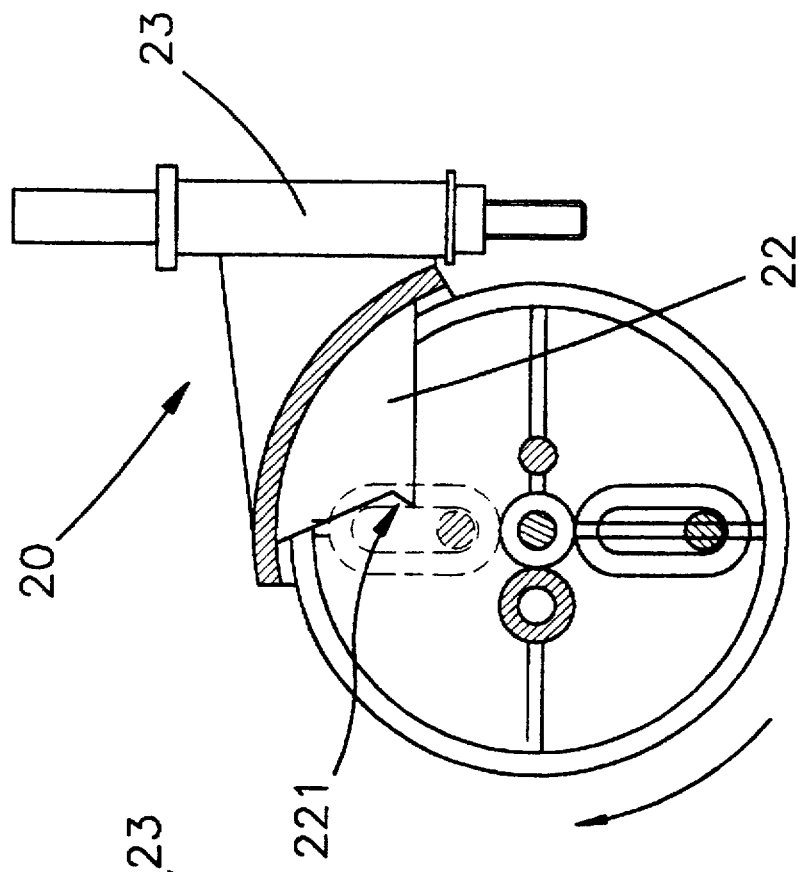
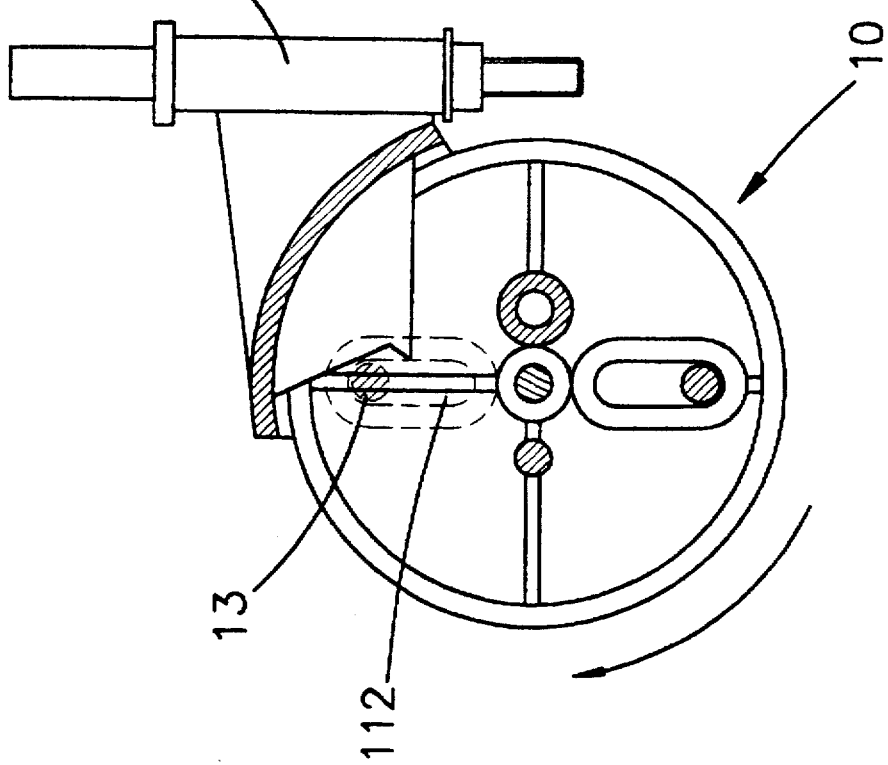
FIG.3A
FIG.3B

WHEEL WITH BRAKE DEVICE

FIELD OF INVENTION

The present invention relates to a type of wheel structure equipped with a braking system.

BACKGROUND OF THE INVENTION

Conventional wheels applied onto chairs, trolleys or toddler chairs generally rotate in 360° and are fairly convenient. However, when the wheels are used on toddler chairs, danger often ensues due to improper operation or rapid sliding. To resolve this particular problem, this invention seeks to provide a safer wheel device through research and development.

SUMMARY OF THE INVENTION

The primary objective of this invention is to provide a type of wheel which has a brake device. A shaft is facilitated in the wheel which will lock onto a convex member on the inner side of a secure mount when the wheel is in rapid motion under the influence of centrifugal force. The lock thus restricts the wheel's motion and achieves a brake function.

The objective, feature and function of this invention are detailed below.

Figure 1:
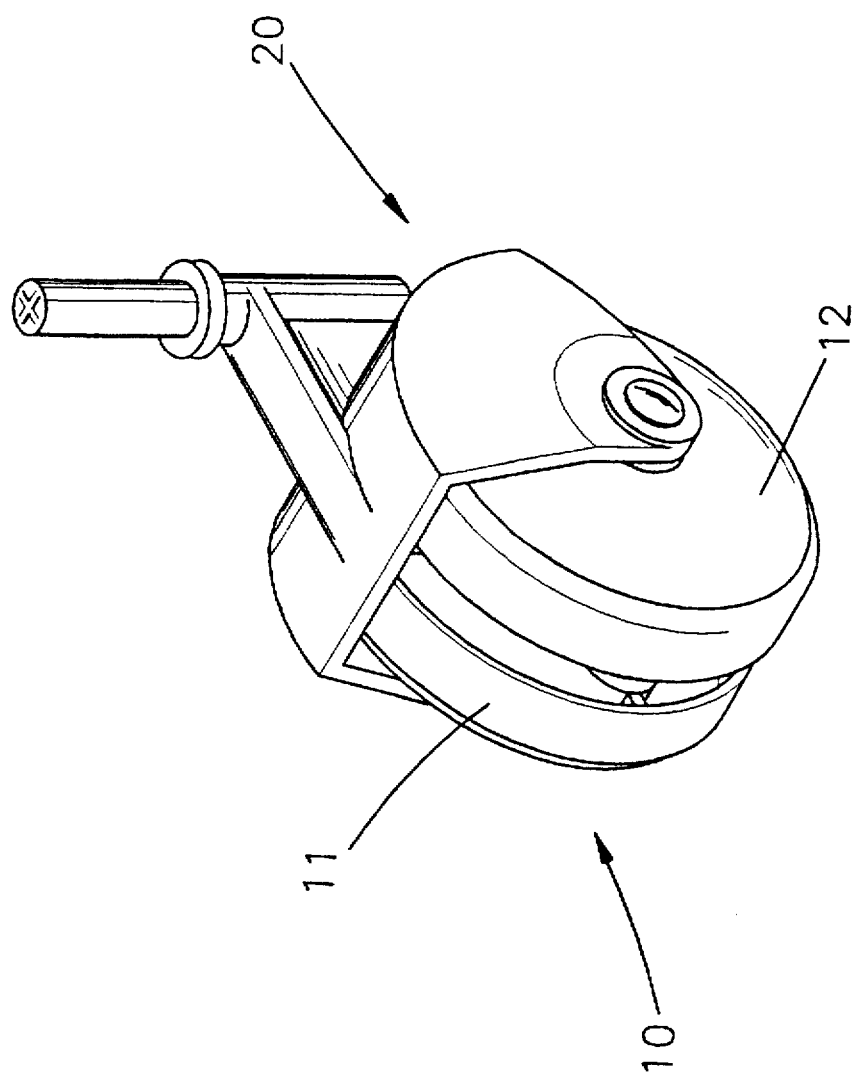
Figure 2:
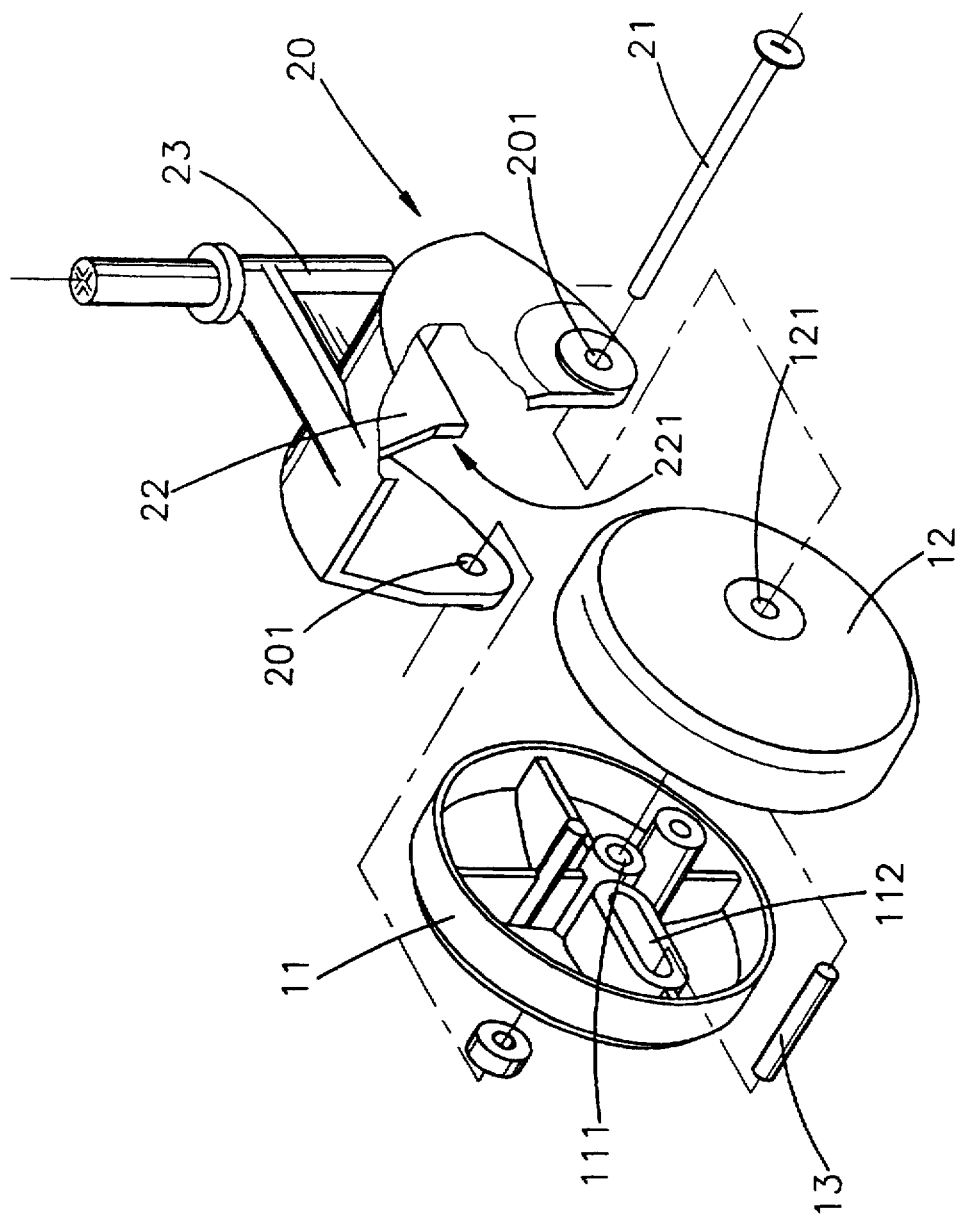
Figure 4:
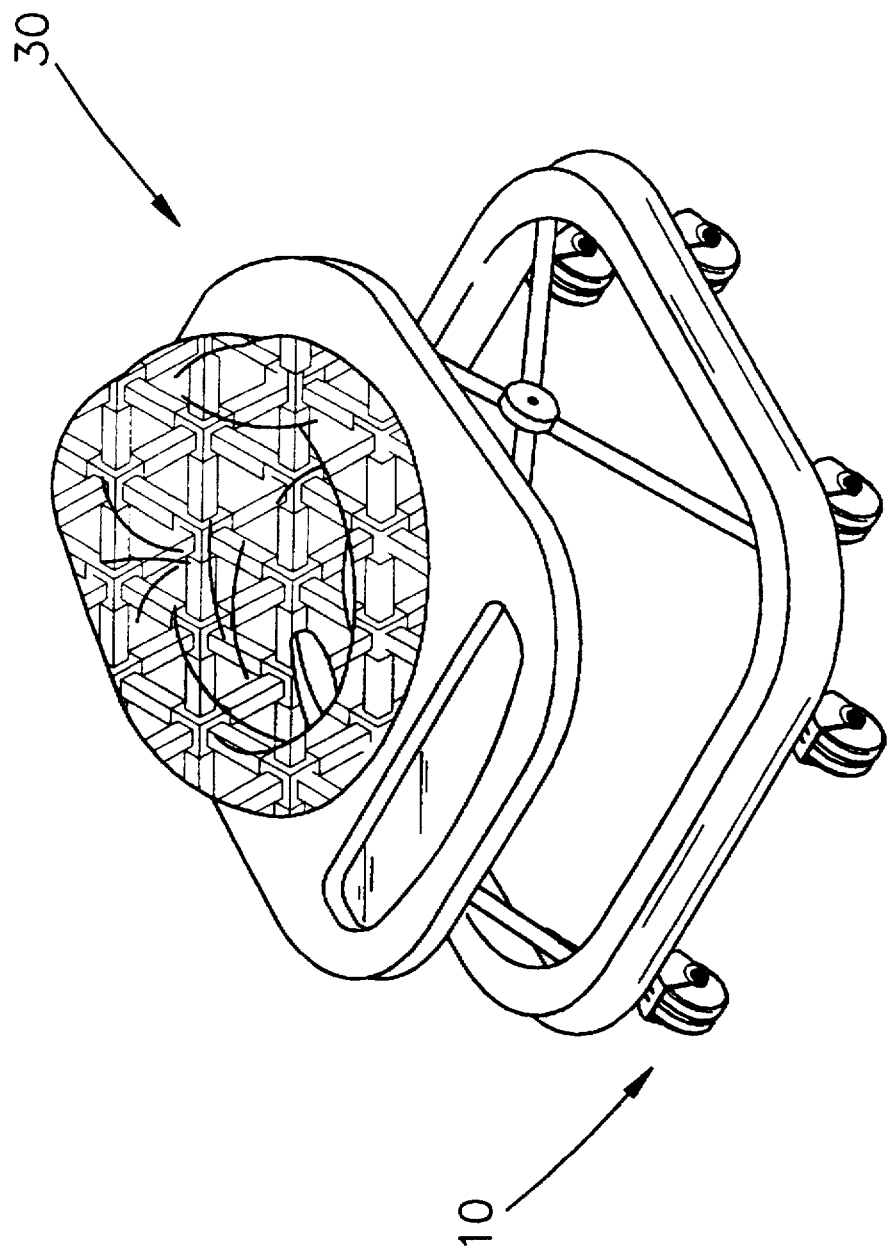

BRIEF DESCRIPTION OF THE DRAWINGS AND THEIR COMPONENT NUMBERS (A) The Drawings FIG. 1 The 3 dimensional structural design of this invention;

FIG. 2 The disassembled view of FIG. 1;

FIGS. 3A and 3B The dissected view of this invention's structure;

FIG. 4 Simulated view of this invention applied to a toddler's walker;

(B) The Component Numbers
10 Wheel
11 Housing
111 Centre Hole
112 Curved Trough
12 Housing
13 Shaft
20 Secure Mount
201 Through-Hole
21 Axle
22 Convex Ridge
221 Locking Device
23 Joining Axle
30 Toddler's walker

DESCRIPTION OF THE INVENTION

FIG. 1 is the 3 dimensional structural design of this invention; please also refer to FIG. 2, the disassembled view, for the following description. The wheel (10) consists of 2 housings (11) (12) and a secure mount (20). Each of the 2 housings (11) (12) is only sealed on one side with a centre hole (111) (121). A curved trough (112) is located at a suitable position on the inner side of housing (11) from the centre hole (111) to the outer edge of housing (11). A shaft (13) is placed on top of the curved trough (112); each end of the shaft (13) touches the inner side of the 2 housings (11) (12) respectively. The secure mount (20) fits over the 2 outer sides of the 2 housings (11) (12); a through-hole (201) is defined on each of the two flaps of the secure mount (20) in corresponding positions to the centre holes (111) (121) on the sides of 2 housings (11) (12). An axle (21) runs through the secure mount (20) and the 2 housings (11) (12) to form the wheel (10). A convex ridge (22) is devised in the inner centre of the secure mount (20) and extends to the inner sides of the 2 housings (11) (12). The end of the convex ridge (22) is equipped with a locking portion (221). A joining axle (23) is devised on the outer side of the secure mount (20) which is applied to connect to chairs, toddler's walkers, etc. so that the wheel (10) can rotate in 360° for the sliding motion of object it is attached onto.

FIG. 3A and 3B are dissected view of this invention's structure. The convex ridge (22) on the inner side of the secure mount (20) is placed between the inner sides of the 2 housings (11) (12); moreover, the position of the locking portion (221) corresponds to the centre of the curved trough (112). Refer to FIG. 3A for the normal rotating function of the invented wheel (20). The shaft (13) pushed against the 2 housings (11) (12) will slide along the curved trough (112) with the motion of the wheel (10). When the curved trough (112) moves to the upper position of the wheel (10) along with the motion of the wheel (10), the shaft (13) will fall down due to gravity pull. FIG. 3B illustrates the status of the wheel (10) in rapid motion. When the wheel (10) is in rapid motion, the shaft (13) between the 2 housings (11) (12) will swing outward due to centrifugal force so that when the curved trough (112) moves to the top of the wheel (10), the shaft (13) will be instantaneously moved to the top of the curved trough (112) due to centrifugal force and hooked by the locking portion (221). At this time, the motion of the wheel (10) will be terminated immediately and achieve a brake function. The sliding motion of the wheel (10) can only be regained when it is not subjected to centrifugal force.

FIG. 4 is the simulated view of this invention applied to a toddler's walker. As users of toddler's walkers are not able to control nor operate walkers properly; injury often incurs during use due to fast sliding or uncontrollable sliding on sloped surfaces. The wheel device (10) of this invention allows sliding within a certain speed range in deterring danger due to fast motion and provides safety protection.

In summary, this invention, is equipped with the functions of practicality, innovation and safety. Moreover, no literature or publication has been issued on similar or related structure design.

Moreover, the above description is merely intended as an illustration of this invention; instances cited shall not restrict the application scope of this invention. The patent rights applied for this invention shall cover all alternative and revised functions of this invention.

What is claimed is:

1. A wheel, comprising:
   first and second wheel housings, each wheel housing defining a trough portion;
   a wheel mount having a convex ridge, said wheel mount rotatably supporting said first and said second wheel housings such that said trough portions are aligned to form a trough, said convex ridge having a locking portion disposed between said wheel housings; and
   a locking shaft movably received in said trough,
   wherein when said wheel housings are rotating at a locking speed, said locking shaft moves radially in said trough and engages said locking portion of said convex ridge to prevent rotation of said wheel.

2. The wheel as defined in claim 1, wherein:
   said locking portion of said convex ridge is positioned proximal to a center portion of said trough.

* * * * *